Patented Apr. 21, 1925.

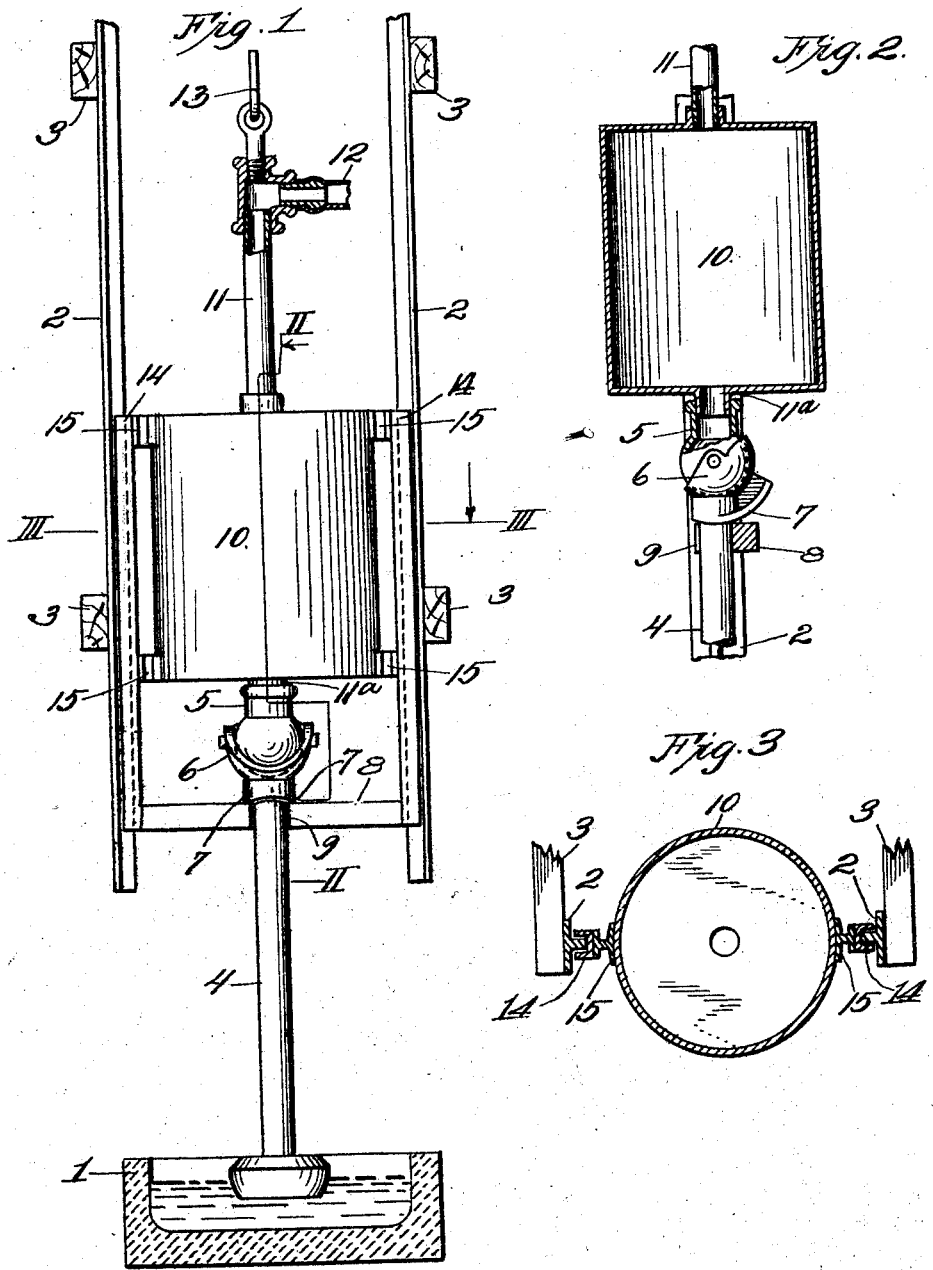

1,534,432

UNITED STATES PATENT OFFICE.

WILLIAM WESTBURY, OF ELMIRA, NEW YORK.

APPARATUS FOR DRAWING GLASS CYLINDERS.

Application filed August 25, 1924. Serial No. 733,956.

*To all whom it may concern:*

Be it known that I, WILLIAM WESTBURY, a citizen of the United States, and a resident of Elmira, county of Chemung, State of New York, have invented a certain new and useful Improvement in Apparatus for Drawing Glass Cylinders, of which the following is a complete specification.

This invention relates to apparatus for drawing glass cylinders, and more especially to that class in which the air employed in the blowing of the cylinders, is supplied by mechanical means, and my object is to produce apparatus embodying a large chamber for absorbing excess air pressure to prevent pulsation and irregularity of pressure in the cylinder and thereby guard against permanent swelling or bulging of the latter and insure a more perfect flattening operation.

With this general object in view the invention consists in certain novel and useful features of construction and organization of parts as hereinafter described and claimed; and in order that it may be fully understood, reference is to be had to the accompanying drawing, in which:—

Figure 1 is a view of glass cylinder drawing apparatus embodying the invention, the glass holding means being shown in sections.

Figure 2 is a vertical section taken on the line II—II of Figure 1.

Figure 3 is a horizontal section taken on the line III—III of Figure 1.

In carrying out the invention, the customary pot or its equivalent and hoisting apparatus may be employed and for convenience is illustrated, 1 representing a drawing pot which may be of any suitable or preferred type for holding the supply of molten glass from which the cylinder is to be drawn, 2 the customary vertical tracks and 3 supports for the tracks, which supports may be of the type shown or any other suitable or perferred type. The bait 4 is of the customary or any approved type and carries a pivoted coupling, comprising a portion 5 and a portion 6, the coupling being hollow so that air may pass freely therethrough. The connection between the coupling members will be air tight to prevent leakage to the atmosphere and the lower member is provided with downwardly facing convex shoulders 7 resting upon a support 8, at opposite sides of a notch 9 in its front edge for the accommodation of the bait 4 and to permit it to swing on the couplings as the axis, in a forward direction out of the notch, when a completed cylinder is removed, and rearward into the notch preliminary to the next drawing operation.

An air holder 10 of large capacity, is rigidly connected to the lower end of a pipe 11, coupled in the manner shown or in any other suitable or preferred manner, to a hose pipe 12 leading to a means for supplying air under low pressure, it being obvious that any other flexible connection such as a jointed pipe, (not shown) may be employed for supplying air for the drawing operation. The holder has a depending nipple 11$^a$ on which the portion 5 of the coupling detachably fits and from which it cannot be disengaged until the bait is swung upward and forward sufficiently to disengage the shoulders 7 from the support 8.

The hoisting means may be of any suitable type, and is shown in the form of the customary cable 13 attached to the upper end of the pipe 11, though it is obvious that it may be otherwise connected for the purpose of raising and lowering the bait. The support 8 connects the lower ends of a pair of U-shaped or channelled slides 14 engaging the track 2, and said slides are connected by brackets or bars 15 to the holder 10, the arrangement being such that when power is applied to the hoisting cable or its equivalent, the cage constituted by said holder, slides and cross bar 8, effects upward movement of the bait in a manner and for a purpose well known in the art, air under pressure being continuously supplied for the purpose of producing the cylinder, as customary with this class of apparatus.

When the cylinder has been drawn to the required length, its connections at its lower end with the molten glass is broken, and it is engaged in the usual or in any other suitable manner to a yoke, not shown, and then swung outward at its lower end as the hoisting mechanism is caused to lower the cylinder, the lower part of the bait turning at its jointed or pivoted point as this occurs, and when the bait has obtained a substantially horizontal position within convenient reach of an operator on the floor, the operator shoulders it as is customary and slips or disengages its upper end from the nipple 14 of the air cylinder, and in conjunction with the yoke-carried mechanism, deposits it upon a horse or cradle for convenience in subdividing it into shorter cylinders of predetermined length, which cylinders after removal from the horse, are later split longitudinally and placed in a flattening oven as customary, and later in a clarifying bath, after which it is ready for the cutting room.

From the above description it will be apparent that excess pressure within and tending to swell or bulge the cylinder, is absorbed by the holder without the necessity of any vent to the atmosphere as customary, and to guard more effectively against undue excess pressure, the capacity of the air supply pipe 11 is less than that of the bait and the connection between the same and the holder. In actual practice the excess pressure developed by heat radiated from the glass sometimes swells or bulges the cylinder and it is found that if this occurs the holder absorbs such pressure and the bulge immediately disappears and a cylinder is produced which is uniform in diameter and in thickness of its walls.

I claim:—

1. A glass drawing apparatus, comprising a molten glass container, means for supplying air under pressure, a holder to receive such air, a bait detachably depending from and communicating with the holder, and means for raising and lowering the holder and bait.

2. A glass drawing apparatus, comprising a molten glass container, means for supplying air under pressure, a holder to receive such air, a bait detachably depending from and communicating with the holder, means for raising and lowering the holder and bait, and means for insuring direct vertical movement of the holder and bait toward and from the container.

3. A glass drawing apparatus, comprising a molten glass container, a vertical track above the container, a cage slidable on the track, including an air holder having a depending nipple, a bait having a jointed upper end fitting on said nipple, and means for preventing disconnection of the jointed end of the bait from the nipple while the bait occupies a substantially vertical position.

4. In a glass drawing apparatus, an air holder movable vertically, a notched support below the holder, a bait extending through the notch of said support, a jointed tubular coupling secured on the upper end of the bolt and detachably connected to the holder, and a shoulder concentric with the pivot of said coupling and resting on said support to prevent disconnection of the coupling from the holder when the bait occupies a substantially vertical position.

In witness whereof I hereunto affix my signature.

WILLIAM WESTBURY.